United States Patent

Choi

[11] Patent Number: 5,967,226
[45] Date of Patent: Oct. 19, 1999

[54] SLUSH MACHINE

[75] Inventor: Sang Kyong Choi, Changwon, Rep. of Korea

[73] Assignee: LG Industrial Systems, Co., Ltd., Seoul, Rep. of Korea

[21] Appl. No.: 08/977,803

[22] Filed: Nov. 25, 1997

[51] Int. Cl.[6] .................................................. A23G 9/16
[52] U.S. Cl. .............................................. 165/63; 62/342
[58] Field of Search ....................... 62/342, 343; 165/61, 165/63, 64; 222/146.1

[56] References Cited

U.S. PATENT DOCUMENTS

| | | | |
|---|---|---|---|
| 2,414,521 | 1/1947 | Gunther | 165/63 |
| 2,744,391 | 5/1956 | Deane | 165/61 |
| 2,767,960 | 10/1956 | Fast | 165/61 |
| 3,628,602 | 12/1971 | Brunner | 165/61 |
| 3,648,477 | 3/1972 | Shartle | 165/61 |
| 3,724,235 | 4/1973 | Carpigiani | 165/61 |
| 4,680,944 | 7/1987 | Menzel | 165/61 |

*Primary Examiner*—William E. Tapolcai
*Attorney, Agent, or Firm*—Oliff & Berridge, PLC

[57] ABSTRACT

A slush machine which is capable of selectively providing a slush state or hot drink. The machine includes a main body casing, a refrigerating cycle apparatus including a compressor installed in the main body machine, a condenser connected with the compressor, a capillary tube connected with the condenser, and a cylindrical evaporator drum mounted above the main body casing, which evaporator drum is the equivalent of an evaporator, wherein one side of the evaporator drum being connected with the capillary tube and the other side of the same being connected with the compressor, a drink source container installed above the main body casing and in which the evaporator drum is installed, scrapers formed to contact with inner and outer circumferential surfaces of the evaporator drum and drivingly engaged with a rotary shaft, a driving member for rotating the rotary shaft to which the scrapers are engaged, a discharging member formed in a lateral side of the drink source container for discharging a drink therethrough, and a heating member mounted in the drink source container for heating the drink therein.

4 Claims, 8 Drawing Sheets

SLUSH MACHINE

BACKGROUND OF THE INVENTION

1. Field of the Invention

The present invention relates to a slush machine, and in particular to an improved slush machine which is capable of selectively providing a slush state or hot drink.

2. Description of the Background Art

As shown in FIG. 1, the background art slush machine includes a compressor 2 installed in a casing 1, a condenser 3 connected with the compressor 2, and a capillary tube (not shown) connected with the condenser 3.

In addition, there are further provided a cooling fan 4 installed beside the condenser 3 for cooling the condenser 3, and a driving motor 5 installed in an inner upper portion of the casing 1.

A drink source container 6, in which a drink source is filled, has a predetermined volume and is installed above the casing 1, and a cylindrically formed evaporator drum 7, which is the equivalent of an evaporator, is installed in an inner lower portion of the drink source container 6.

Here, the compressor 2, condenser 3, the capillary tube (not shown) and the evaporator drum 7 installed in the drink source container 6 forms a refrigerating cycle.

In addition, a rotary shaft 8 is connected with a transmission apparatus (not shown) covered by a transmission apparatus casing 14 and is longitudinally installed within the evaporator drum 7, and spiral scrapers 9 are connected with the rotary shaft 8, respectively, one of which is spacedly inserted into the evaporator drum 7 and the other one of which is spacedly inserted onto the same, so that the scrapers 9 rotatably contact with the inner and outer circumferential surfaces of the evaporator drum 7, respectively.

In addition, a driving member is installed in a lower portion of the drink source container 6 for rotating the scraper 9 connected with the rotary shaft 8 by rotating the rotary shaft 8, and a discharge member is engaged to another lower portion of the drink source container 6 for discharging the drink source from the drink source container 6 to the outside.

The driving member and discharge member will now be explained in more detail.

The driving member includes a driving motor 5 installed in an inner upper portion of the main body casing 1, a transmission apparatus (not shown) connected with the driving motor 5 and installed in a lower portion of the drink source container 6 for transmitting a driving force to the rotary shaft 8, to which the scraper 9 is attached, by varying the rotation speed of the driving motor 5, and a transmission apparatus casing 14 for covering the transmission apparatus (not shown).

In addition, the discharge member includes a discharge port 6a formed in a lower portion of the drink source container 6, a discharge tube 10 communicating with the discharge port 6a, a piston 11 upwardly and downwardly reciprocating within the discharge tube 10 for opening/closing the discharge port 6a, a linear spring 13 elastically connected with the piston 11, and a discharge lever 12 connected with the linear spring 13 for downwardly and upwardly moving the piston 11.

Since the slush machine includes a refrigerating cycle apparatus therein, a slush state fruit juice or various kinds of slush state drink are made by the refrigerating cycle apparatus.

The operation of the background art slush machine will now be explained.

First, after a drink source is filled into the drink source container 6, when an electric power is supplied to the apparatus, the refrigerating cycle apparatus is operated. Ice is formed on the inner and outer circumferential surfaces of the evaporator drum 7 which is the equivalent of the evaporator. The rotary shaft 8 connected with the scraper 9 contacting with the inner and outer circumferential surfaces of the evaporator drum 7 is rotated by the driving motor 5. At this time, the scraper 9 rotates and contacts with the inner and outer circumferential surfaces of the evaporator drum 7 for thus scrapping the ice formed on the inner and outer circumferential surfaces of the evaporator drum 7.

The scraper 9 continuously scraps the ice formed on the inner and outer circumferential surfaces of the evaporator drum 7, and the thusly scraped ice is mixed with the drink source in the drink source container 6, thus producing a slush state drink.

When discharging the thusly produced slush state drink, the discharge lever 12 beside the drink source container 6 is downwardly pulled. At this time, the piston 11 is upwardly moved, and then the discharge port 6a is opened, so that the slush state drink in the drink source container 6 is discharged through the discharge port 6a and the discharge tube 10 communicating with the discharge port 6a.

However, since the conventional slush machine is capable of generating only a slush state cool drink, it is generally used in summer. Namely, it is not used in winter, so that it is difficult to maintain the slush machine in winter, whereby the applicable range of the slush machine is limited.

SUMMARY OF THE INVENTION

Accordingly, it is an object of the present invention to provide a slush machine which overcomes the aforementioned problems encountered in the background art.

It is another object of the present invention to provide a slush machine which is capable of selectively providing a slush state or hot drink.

To achieve the above objects, there is provided a slush machine which includes a main body casing, a refrigerating cycle apparatus including a compressor installed in the main body machine, a condenser connected with the compressor, a capillary tube connected with the condenser, and a cylindrical evaporator drum mounted above the main body casing, which evaporator drum is the equivalent of an evaporator, wherein one side of the evaporator drum being connected with the capillary tube and the other side of the same being connected with the compressor, a drink source container installed above the main body casing and in which the evaporator drum is installed, scrapers formed to contact with inner and outer circumferential surfaces of the evaporator drum and drivingly engaged with a rotary shaft, a driving member for rotating the rotary shaft to which the scrapers are engaged, a discharging member formed in a lateral side of the drink source container for discharging a drink therethrough, and a heating member mounted in the drink source container for heating the drink therein.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The slush machine according to the present invention will now be explained with reference to the accompanying drawings.

Figure 1:
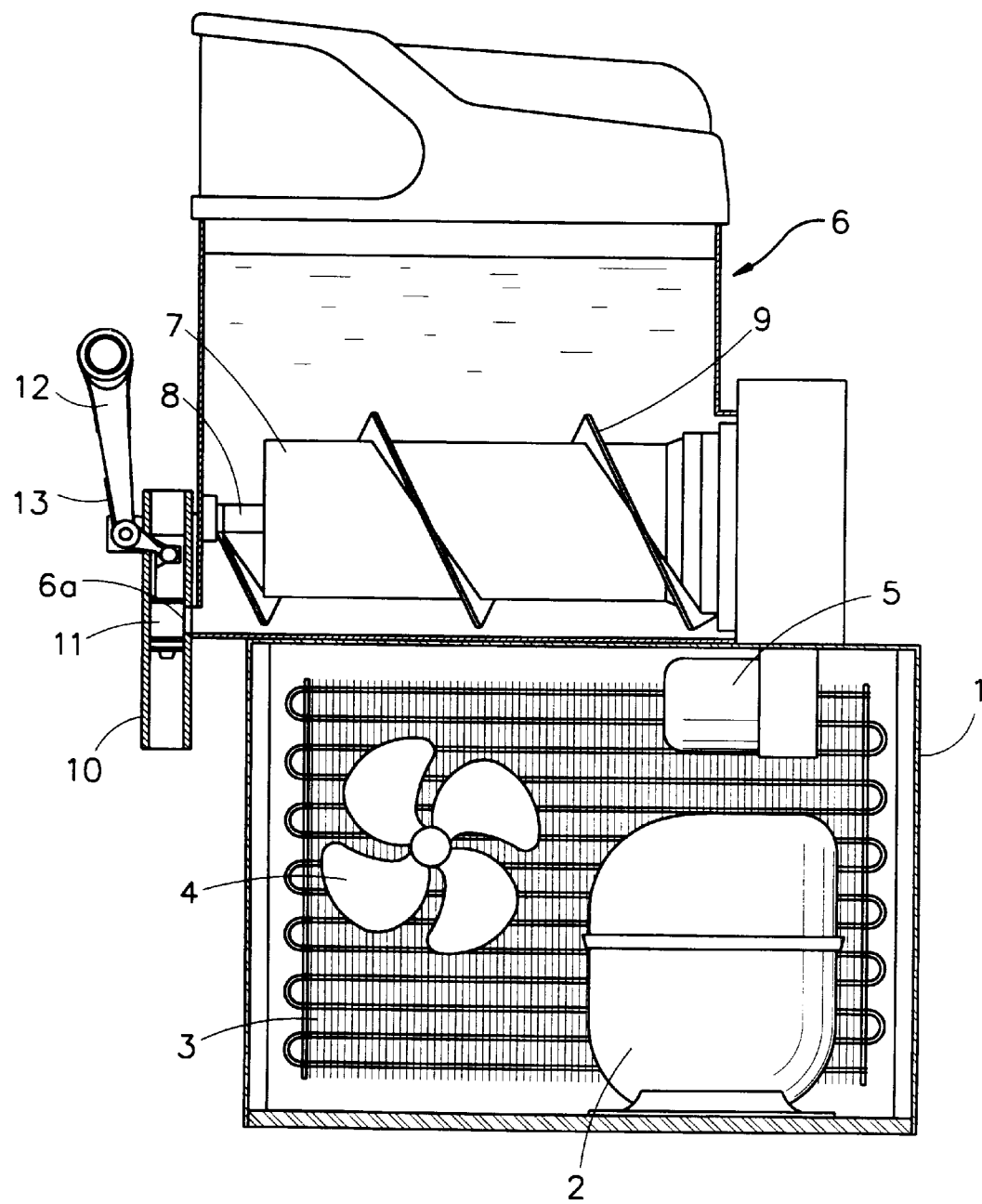
FIG. 1 is a lateral cross-sectional view illustrating a background art slush machine.
Figure 2:
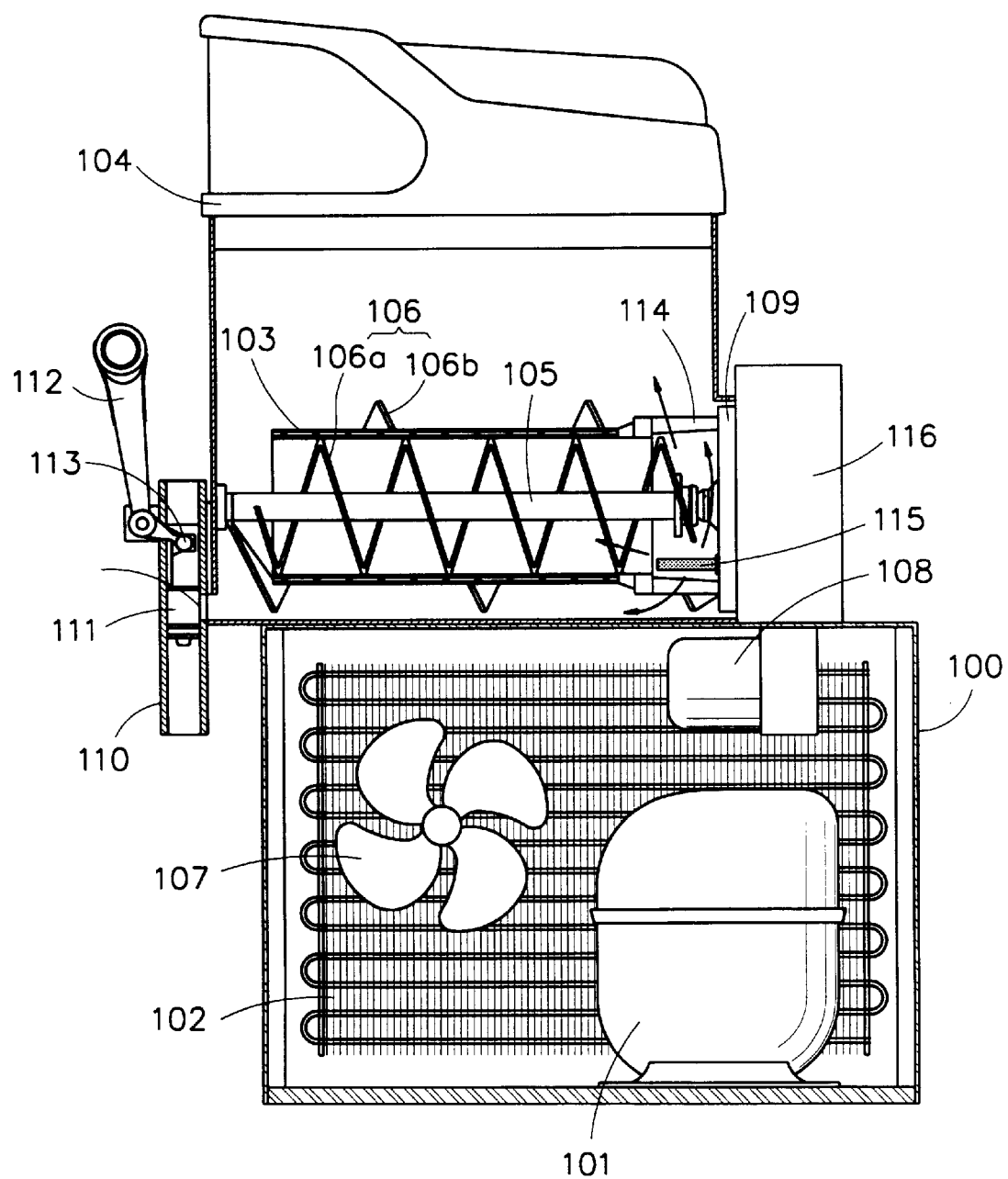
FIG. 2 is a lateral cross-sectional view illustrating a slush machine according to a first embodiment of the present invention.

As shown in FIG. 2, the slush machine according to a first embodiment of the present invention includes a main body casing 100 having a predetermined size, a compressor 101 installed in an inner lower portion of the main body casing 100, a condenser 102 connected with the compressor 101, a capillary tube (not shown) connected with the condenser 102, and an evaporator drum 103, which is the equivalent of the evaporator and is installed within a drink source container 104 mounted on the upper surface of the main body casing 100, one side of which evaporator drum is connected with the capillary tube (not shown) and the other side of the same is connected with the compressor 101. With the above-described elements, a refrigerating cycle apparatus is constituted.

In addition, a cooling fan 107 is installed beside the condenser 102 of the main body casing 100 for cooling the condenser 102.

The drink source container 104 having a predetermined volume is installed on the upper surface of the main body casing 100, within which the evaporator drum 103 which is one of the elements of the refrigerating cycle apparatus is installed.

There are further provided a rotary shaft 105 longitudinally installed within the evaporator drum 103, and spirally formed scrapers 106 engaged with the rotary shaft 105 and contacting with inner and outer circumferential surfaces of the evaporator drum 103, respectively.

At this time, the scrapers 106 are composed of an outer scraper 106a which is spacedly inserted onto the evaporator drum 103 and contacts with an outer circumferential surface of the evaporator drum 103 and an inner scraper 106b which is spacedly inserted into the evaporator drum 103 and contacts with an inner circumferential surface of the evaporator drum 103.

A driving member is provided for rotating the scrapers 106 engaged with the rotary shaft 105 by rotating the rotary shaft 105, and a discharge member disposed in a lateral portion of the drink source container 104, through which a drink source is discharged to the outside.

A heating member is installed in an inner lower portion of the drink source container 104 for heating the drink source therein.

The driving member, the discharge member, and the heating member will be explained in more detail.

The driving member includes a driving motor 108 installed in an inner upper portion of the main body casing 100, a transmission apparatus (not shown) connected with the driving motor 108 and installed below the drink source container 104 for varying the rotational speed of the driving motor 108 and rotating the scrapers 106 engaged to the rotary shaft 105, and a transmission apparatus casing 116 for covering the transmission apparatus (not shown).

In addition, the discharge member includes a discharge tube 110 communicating with a discharge port 104a formed in a lower portion of the drink source container 104, a piston 111 inserted within the discharge tube 110 for being upwardly and downwardly reciprocated for opening/closing the discharge port 104a, a lever 112 for operating the piston 111, and a lever spring 113 connected with the lever 112.

The heating member will be explained in more detail with reference to the accompanying drawings.

Figure 3A:
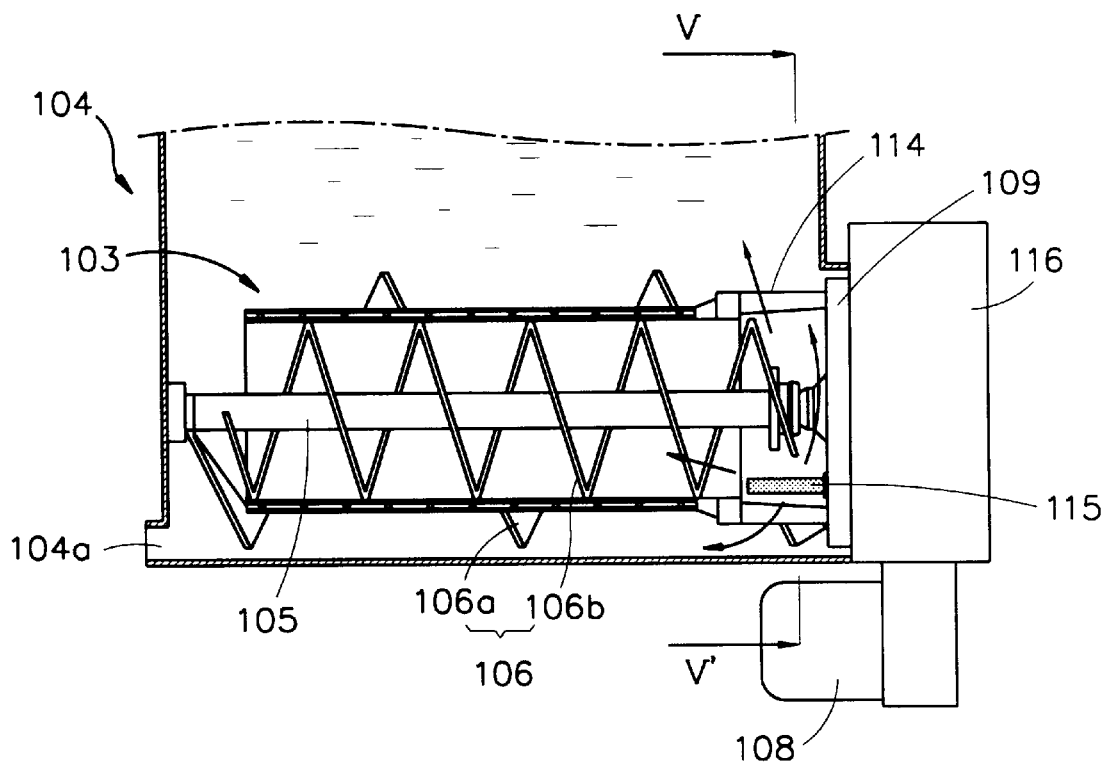
FIG. 3A is a lateral cross-sectional view illustrating a heater mounting structure for a slush machine according to a first embodiment of the present invention.

As shown in FIG. 3A, the heating member includes a heater 115 attached to a lower portion of a support surface 109 of the evaporator drum 103 supported by a plurality of support ribs 114.

Figure 3B:
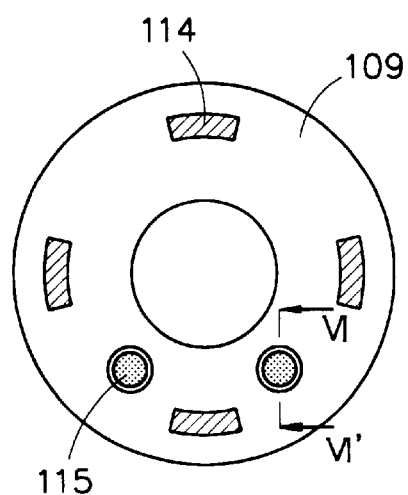
FIG. 3B is a cross-sectional view taken along line V-V' in FIG. 3A.

As shown in FIG. 3B, each heater 115 is composed of a plurality of cartridge type heaters mounted between the neighboring support ribs 114 which are attached to the intermediate portion and lower portion of the support surface 109, respectively.

At this time, the heaters 115 each have a predetermined length in order for the evaporator drum 103 to generate the maximum heat transfer efficiency. Namely, the length of the same is determined so that the heaters 115 do not contact with the inner scraper 106b rotating along the inner circumferential surface of the evaporator drum 103, and each end portion of the heaters 115 is connected with an externally connected terminal.

The surfaces of each of the heaters is coated with a teflon in order to prevent the particles of a slush state drink or the like from attaching thereon.

Figure 3C:
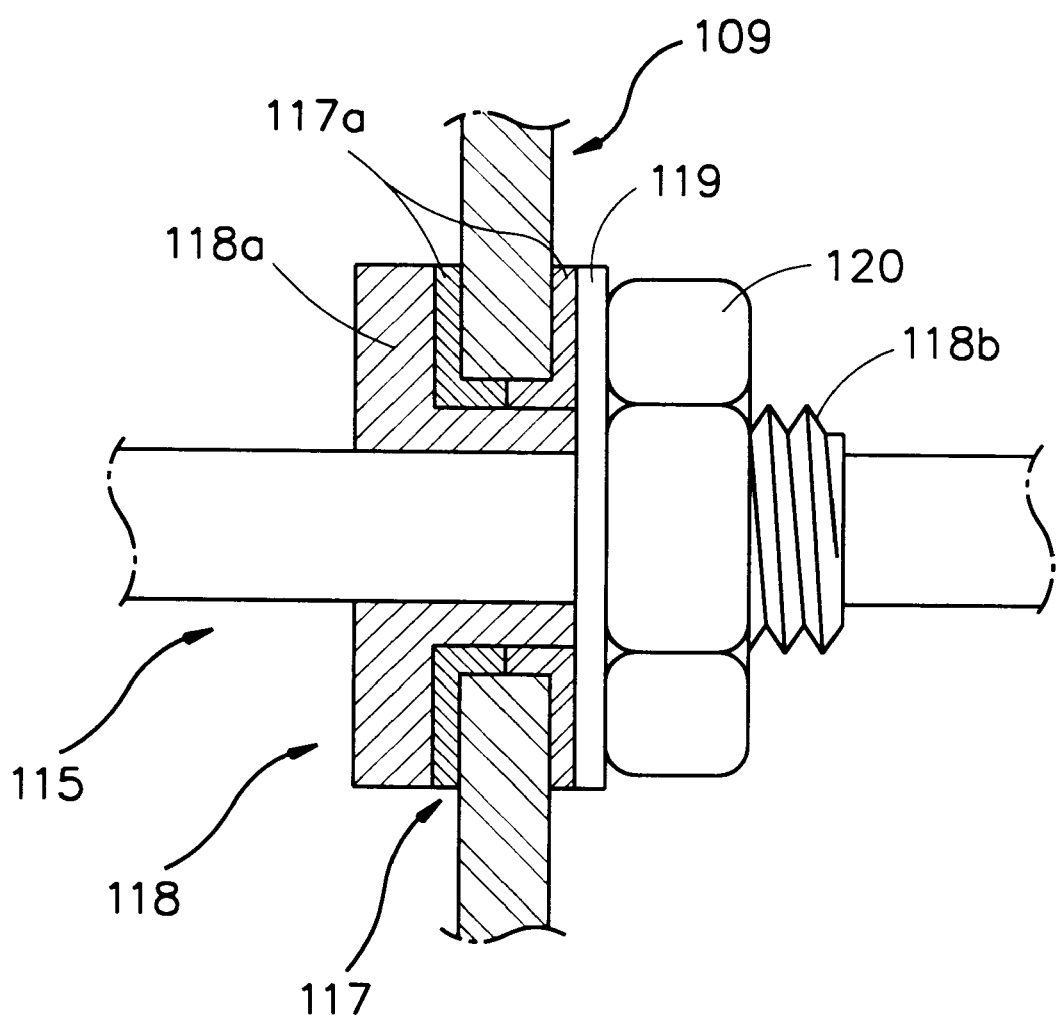
FIG. 3C is a cross-sectional view taken along line VI-VI' in FIG. 3B.

The structure for mounting the heater 115 on the support surface 109 of the evaporator drum 103 will be explained with reference to FIG. 3C.

Figure 4:
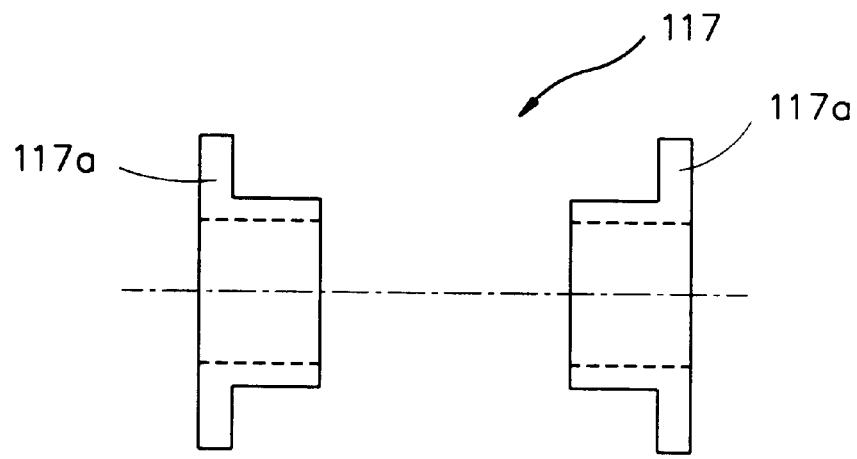
FIG. 4 is a lateral view illustrating a heater supporting member according to the present invention.

A heater insertion hole (not shown) is formed in the support surface 109, and a pair of flange-shaped sealing members 117 are inserted into the heat insertion hole from both sides of the same, thus forming a pulley-shaped sealing member 117 when assembled, as shown in FIG. 4, for preventing a heat transfer of the heater 115 to the support surface 109 and a leakage of the drink to the outside.

A support member 118 is inserted into the heater insertion hole (not shown) after the sealing members 117 are inserted into the same and is welded to a portion of the heater 115.

Figure 5:
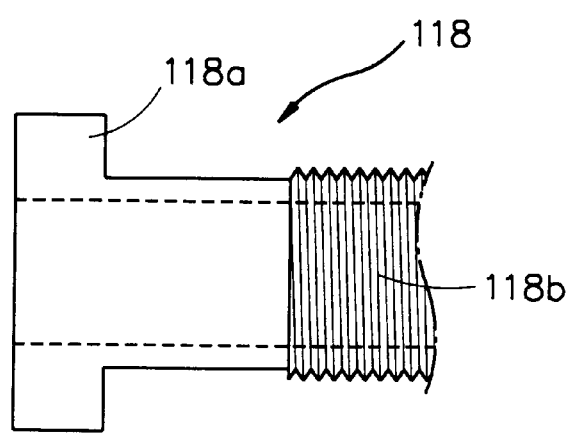
FIG. 5 is a lateral view illustrating a sealing member according to present invention.

As shown in FIG. 5, the support member 118 includes a head portion 118*a* and a threaded portion 118*b* having a diameter smaller than the head portion 118*a*. The head portion 118*a* contacts with a contact surface 117*a* of the sealing member 117 inserted into the heat insertion hole (not shown), and the threaded portion 118*b* is inserted in such a manner that a washer 119 made of a teflon material contacts with the contact surface 117*a* of the sealing member 117 and then is engaged with a nut 120, so that the heater 115 is engaged with the support surface 109 connected with the evaporator drum 103.

At this time, the sealing member 117 is preferably formed of a synthetic resin which is capable of enduring a predetermined temperature of the heater 115.

The heating member of the slush machine according to a second embodiment of the present invention will now be explained with reference to the accompanying drawings.

Figure 6A:
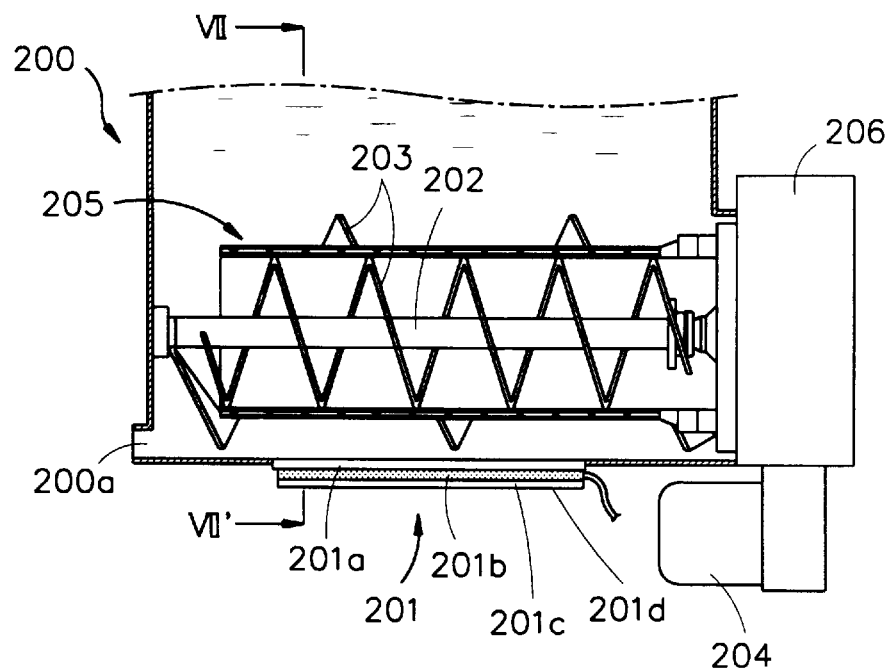
FIG. 6A is a lateral cross-sectional view illustrating a heater mounting structure for a slush machine according to second embodiment of the prevent invention.
Figure 6B:
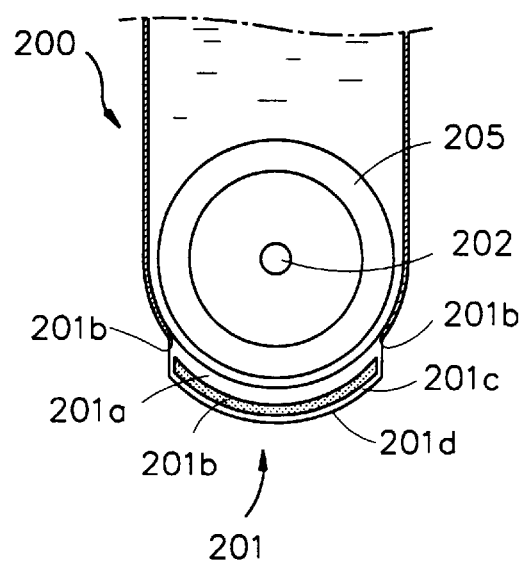
FIG. 6B is a cross-sectional view taken along line VII-VII' in FIG. 6A.

As shown in FIGS. 6A and 6B, the heating member includes a longitudinal heater engaging portion 200*b* which is formed on a bottom surface of the drink source container 200, into which a drink source is filled, by cutting away a predetermined-shaped portion, thus forming a predetermined-shaped hole, and a heater 201 mounted in the heater engaging portion 200*b*.

An upper plate 201*a* of the heater 201 is preferably made of a stainless steel, and an asbestos-covered heater 201*b* (code heater) is mounted on the lower portion of the upper plate 201*a*.

In addition, a form polyethylene 201*c* is attached on the upper surface of the asbestos-covered heater 201*b*, and an aluminum tape 201*d* is attached on the lower surface of the form polyethylene 201*c*.

A gap between the upper plate 201*a* and the heater engaging portion 200*b* is sealed by a sealant such as a silicon.

The cross section of the heat 201 is an arch shape.

In the drawings, reference numeral 200*a* denotes a discharge port through which drink is discharged, 202 denotes a rotary shaft, 203 denotes a scraper, and 204 denotes a driving motor for driving the rotary shaft 202 and the scraper 203, respectively.

The elements except the above-described elements are the same as in the first embodiment of the present invention, namely, the refrigerating cycle apparatus, the driving member and the discharge member are the same as in the first embodiment of the present invention.

The heating member of the slush machine according to a third embodiment of the present invention will be explained with reference to the accompanying drawings.

Figure 7A:
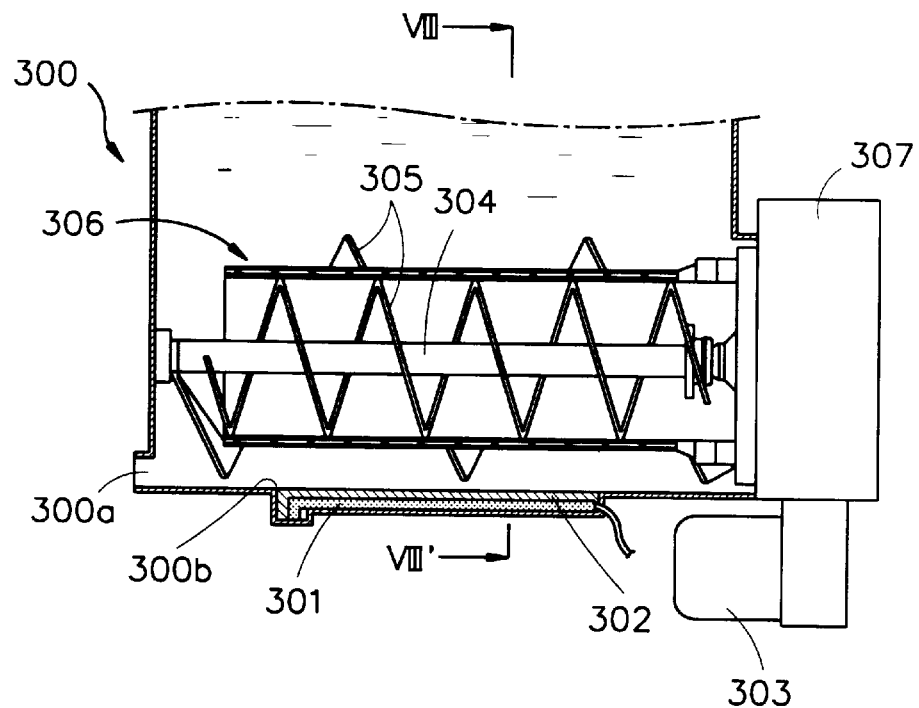
FIG. 7A is a lateral cross-sectional view illustrating a heater mounting structure for a slush machine according to third embodiment of the prevent invention.
Figure 7B:
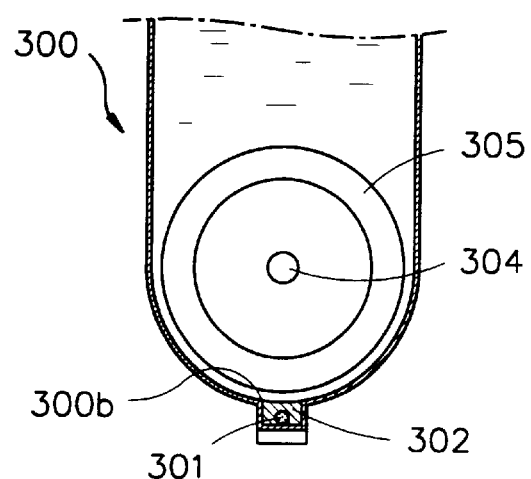
FIG. 7B is a cross-sectional view taken along line VIII-VIII' in FIG. 7A.

As shown in FIGS. 7A and 7B, the heating member according to the present invention includes a square-shaped heater engaging portion 301 formed on the bottom surface of the drink source container 300 by extending the lower surface of the drink source container 300, differently from the second embodiment of the present invention directed to cutting away the same portion, and having a longitudinal square-shaped groove 300*b*, and a longitudinal cartridge heater 301.

A gasket 302 made of a teflon material is attached on a portion of the groove 300*b* except the portion where the cartridge heater 301 is mounted.

In the drawings, reference numeral 300*a* denotes a discharge port through which a drink is discharged, 303 denotes a driving motor, 304 denotes a rotary shaft, 305 denotes a scraper, 306 denotes an evaporator drum, and 307 denotes a transmission casing.

The elements except the above-described elements are the same as in the first embodiment. Namely, the refrigerating cycle apparatus, the driving member, and the discharging member have the same construction and function as in the first embodiment of the present invention.

The heating member for a slush machine according to a fourth embodiment of the present invention will now be explained with reference to the accompanying drawings.

Figure 8A:
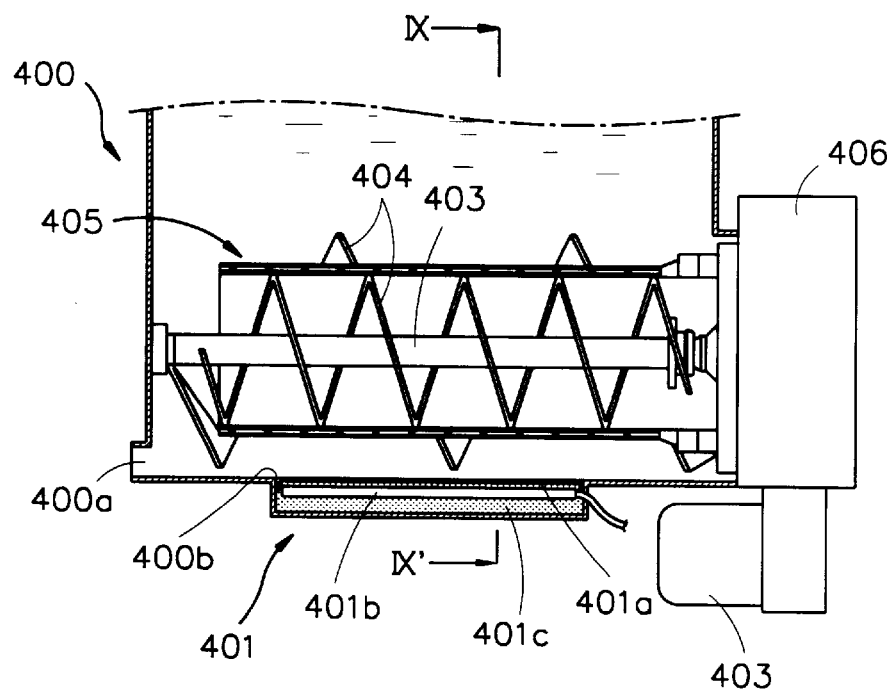
FIG. 8A is a lateral cross-sectional view illustrating a heater mounting structure for a slush machine according to fourth embodiment of the prevent invention.
Figure 8B:
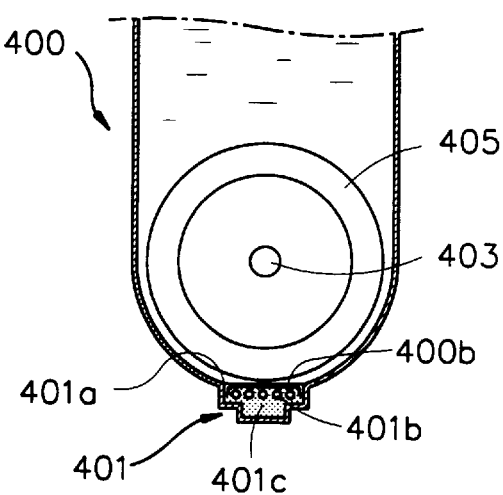
FIG. 8B is a cross-sectional view take along IX—IX' line FIG. 8A.

As shown in FIGS. 8A and 8B, the heating member according to the fourth embodiment of the present invention includes a T-shaped heater engaging portion formed on the bottom surface of the drink source container 400, an upper surface plate 401*a* made of a stainless steel and mounted on the heat engaging portion, and a mica insulation band-shaped heater 401 having heating wires 401*b* attached on the lower surface of the upper surface plate 401*a* and a mica material 401*c* attached on the lower surface of the heating wire 401*b*.

In addition, the heater 401 is mounted on the T-shaped groove 400*b*, and a gap between the upper surface plate 401*a* of the heater 401 and the heater engaging portion 400*b* is sealed by a sealant such as a silicon.

In the drawings, reference numeral 400*a* denotes a discharge port through which drink is discharged, 402 denotes a driving motor, and 403 denotes a rotary shaft. In addition, 404 denotes a scraper, 405 denotes an evaporator drum, and 406 denotes a transmission casing.

The elements except the above-described elements are the same as in the first embodiment of the present invention. Namely, the refrigerating cycle apparatus, the driving member, and the discharging member have the same construction as in the first embodiment of the present invention.

The operation of the slush machine according to the present invention will now be explained.

First, in the mode of providing a slush state drink, the drink source is provided into the drink source containers 104, 200, 300 and 400. In this state, when an electric power is supplied to the machine, the refrigerating cycle apparatus of the slush machine is operated, so that the drink source is iced on the inner and outer circumferential surfaces of the evaporator drums 103, 205, 306 and 405.

As the rotary shafts 105, 202, 304 and 403 are rotated, the scrapers 106, 203, 305 and 404 engaged with the rotary shafts 105, 202, 304 and 403 and rotatably contacting with the inner and outer circumferential surfaces of the evaporator drums 103, 205, 306 and 405 are rotated, thus scrapping the ices formed on the inner and outer circumferential surfaces of the evaporator drums 103, 205, 306 and 405.

As the scrapers 106, 203, 305 and 404 continuously scrape the ices formed on the evaporator drums 103, 205, 306 and 405, the thusly scraped ices are mixed with the drink sources in the drink source containers 104, 200, 300 and 400, thus producing a slush state drink.

When discharging the thusly generated slush state drink, the discharge lever 112 installed in a lateral portion of each of the drink source containers 104, 200, 300 and 400 is downwardly pulled, so that the piston 113 inserted into the discharge tube 110 is upwardly moved, and the discharge ports 104*a*, 200*a*, 300*a*, 400*a* are opened.

Therefore, the slush state drink in the drink source containers 104, 200, 300 and 400 is discharged through the discharge ports 104, 200a, 300a and 400a and the discharge tube 110 communicating with the discharge ports 104a, 200a, 300a and 400a.

In the mode of providing a hot state drink, the drink source is filled into the drink source containers 104, 200, 300 and 400, and then an electric power is supplied to the heaters 115, 201, 301, and 401, so that the drink in the interior of the drink source containers 104, 200, 300 and 400 is heated by the heat generated by the heaters 115, 201, 301 and 401.

When discharging the thusly heated drink, the drink is discharged by the same way as the way for discharging the slush state drink.

The heaters 115, 201, 301 and 401 are installed at the bottom surface of the drink source containers 104, 200, 300 and 400 so that the drink gathered at the bottom portions of the drink source containers 104, 200, 300 and 400 is fully heated and discharged to the outside.

As described above, in the slush machine according to the present invention, is since there are provided a refrigerating cycle apparatus including an evaporator drum and a heating member for heating drink, it is possible to selectively use a slush state drink or a hot drink depending on the seasons, so that an applicable range of the slush machine is increased irrespective of the weather.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A slush machine, comprising:

a main body casing;

a refrigerating cycle apparatus including:
   a compressor installed in the main body casing;
   a condenser connected with the compressor;
   a capillary tube connected with the condenser; and
   a cylindrical evaporator drum mounted above the main body casing,
   wherein one side of the evaporator drum is connected with the capillary tube and another side of the evaporator drum is connected with the compressor;

a drink source container installed above the main body casing and in which the evaporator drum is installed;

scrapers formed to contact with inner and outer circumferential surfaces of the evaporator drum and drivingly engaged with a rotary shaft;

a driving means for rotating the rotary shaft to which the scrapers are engaged;

a discharging means formed in a lateral side of the drink source container for discharging a drink therethrough; and a heating means mounted in the drink source container for heating the drink therein, wherein said heating means includes:
   a plurality of supporting ribs for supporting the evaporator drum;
   an evaporator drum supporting surface, to which the supporting ribs are engaged, having at least two heater insertion holes formed in a lower portion thereof;
   a sealing member inserted into each corresponding heater insertion hole of the evaporator drum supporting surface from each side of the heater insertion hole, thus forming a pulley shape when assembled;
   a cylindrical supporting member inserted into each sealing member, the cylindrical supporting member having a head portion and a thread portion with a diameter smaller than the head portion; and
   a heater having an end portion engaged with the cylindrical supporting member.

2. The apparatus of claim 1, wherein said heater is composed of at least two cartridge type heaters.

3. The apparatus of claim 1, wherein said heater is coated with a Teflon for preventing the drink when in a slush state from attaching to the heater.

4. The apparatus of claim 1, wherein said sealing member is made of a synthetic resin which is capable of enduring a temperature of the heater.

\* \* \* \* \*